United States Patent Office

3,635,918
Patented Jan. 18, 1972

1

3,635,918
2-MORPHOLINOSULFINYLBENZOTHIAZOLES
Alfred Bay Sullivan and Robert Henry Campbell, Akron, Ohio, assignors to Monsanto Company, St. Louis, Mo.
No Drawing. Original application June 1, 1967, Ser. No. 642,712, now Patent No. 3,454,590. Divided and this application Nov. 14, 1969, Ser. No. 871,319
Int. Cl. C08f 27/06
U.S. Cl. 260—79.5 B                 3 Claims

ABSTRACT OF THE DISCLOSURE

The disclosure is new compounds such as 2-morpholinosulfinylbenzothiazole of the formula

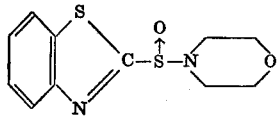

The componds are prepared by the action on the corresponding 2-morpholinothiobenzothiazole of an aqueous solution of an alkali metal hypohalite. The new compounds are useful accelerators for the vulcanization of rubber.

CROSS-REFERENCE TO RELATED APPLICATION

This application is a division of application Ser. No. 642,712, filed June 1, 1967 now U.S. Pat. 3,454,590.

The co-pending application of Alan Jeffrey Neale and Terence James Rawlings, Ser. No. 642,717, filed June 1, 1967 now U.S. Patent 3,454,590 discloses a process for preparing 2-morpholinosulfinylbenzothiazole by the reaction of benzothiazole 2-sulfinyl chloride with morpholine.

BACKGROUND OF THE INVENTION

The invention pertains to the art of accelerators for vulcanizing rubber.

Mingasson's U.S. Pat. 2,585,155, 1952, assigned to Societe Anonyme de Matieres Colorantes et Produits Chimiques Francolor, Paris, France, a French Company, discloses N,N-dimethylbenzothiazole-2-sulfinamide as a vulcanization accelerator.

The compounds of this invention show the improvement of an increase in scorch delay over the corresponding sulfonamides.

SUMMARY OF THE INVENTION

This invention relates to new compounds that are useful vulcanization accelerators for rubber and to a process for their synthesis. The compounds are 2-morpholinosulfinylbenzothiazoles of the formula

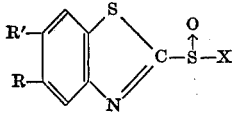

where X is morpholine or a mono-, di-, tri-, or tetraalkylmorpholine. The R and R' are identical or dissimilar combinations of hydrogen, $NO_2$, $CONH_2$, OH, halogen,

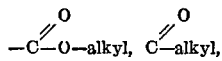

alkyl, or alkoxy. The alkyl groups contain 1 to 5 carbon atoms. The compounds are prepared in a solvent by the action on the corresponding 2-morpholinothiobenzothiazole of an aqueous solution of an alkali metal hypohalite.

2

DESCRIPTION OF THE PREFERRED EMBODIMENTS

Specific examples of the compounds of the invention are:

2-morpholinosulfinylbenzothiazole
2-(2,6-dimethyl-4-morpholinosulfinyl)benzothiazole
2-(2,3,6-trimethyl-4-morpholinosulfinyl)benzothiazole
2-(2-methyl-4-morpholinosulfinyl)benzothiazole
2-(3-methyl-4-morpholinosulfinyl)benzothiazole
2-(2,6-diethyl-4-morpholinosulfinyl)benzothiazole
2-(2,6-dipropyl-4-morpholinosulfinyl)benzothiazole
2-(2,6-dibutyl-4-morpholinosulfinyl)benzothiazole
2-(2,6-diamyl-4-morpholinosulfinyl)benzothiazole
2-(2,6-diisopropyl-4-morpholinosulfinyl)benzothiazole
2-(2,6-diisobutyl-4-morpholinosulfinyl)benzothiazole
5-chloro-2-(morpholinosulfinyl)benzothiazole
6-nitro-2-(morpholinosulfinyl)benzothiazole The compound 2-morpholinosulfinylbenzothiazole is prepared according to the following equation:

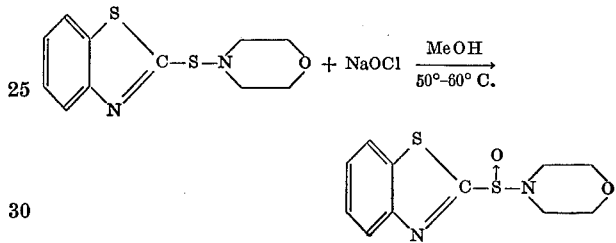

Five grams (0.02 mole) of 2-morpholinothiobenzothiazole and 100 ml. of methanol are charged into a 200 ml. three-necked flask fitted with a stirrer, a reflux condenser and a dropping funnel. The mixture is warmed to 50°–60° C. Forty grams (0.07 mole) of sodium hypochlorite, in which the excess NaOH has been neutralized by adding sufficient 3 molar hydrochloric acid dropwise to obtain a final pH just above 7, is added to the mixture from the dropping funnel over a 30-minute period. The mixture is stirred vigorously during this period and the temperature is maintained at 50°–60° C. The resulting product is isolated by precipitation with 500 ml. of cold water. The white precipitate is filtered, washed and dried. The yield is about 40%. The 2-morpholinosulfinylbenzothiazole has a melting point of 91°–93° C. Gas chromatographic analysis, infrared, and ultraviolet analyses of the product are consistent with the structure 2-morpholinosulfinylbenzothiazole.

Gas Chromatography: (Column-3% SE–52 on 60/80 mesh Gas Chrom-Z; Temperature-200° C.) The product elutes immediately following the starting material as expected due to its higher molecular weight, thus lower volatility.

Infrared Spectroscopy: The infrared spectrum of the isolated product is very similar to that of the starting material with the exception of a strong band at 930 cm.$^{-1}$ which can be assigned to the >S→O stretching vibration.

Ultraviolet Spectroscopy: The product has a maximum absorbance at 278 m$\mu$ with a specific absorbtivity of 40.7 1/g.-cm. in methanol. Upon reduction with $NaBH_4$ in methanol the characteristic ultraviolet spectrum of 2-mercaptobenzothiazole is obtained ($\lambda_{max}$=320 m$\mu$).

The remaining compounds of this invention are prepared in a similar manner to the 2-morpholinosulfinylbenzothiazole preparations with comparable results. The compound 2 - (2,6 - dimethyl-4-morpholinosulfinyl)benzothiazole has a melting point of 108°–110° C.

Sodium hypochlorite is the preferred alkali metal hypohalite useful as an oxidizing agent in this invention. The solvent for the process is a water-miscible solvent in which the reactants are soluble and the solvent is not readily oxidized by the oxidizing agent. The preferred solvent is methanol.

The new compounds can be used as accelerators in the vulcanization of natural and synthetic sulfur-vulcanizable rubbers. Synthetic rubbers that can be vulcanized include polymers of 1,3-butadienes, for example of 1,3-butadiene itself and of isoprene, copolymers of 1,3-butadienes with other monomers for example styrene, acrylonitrile, isobutylene or methyl methacrylate, and polyolefin rubbers for example ethylene-propylene terpolymers.

In the vulcanization process, the accelerators are usually used in conjunction with sulfur or a sulfur-containing vulcanizing agent, for example an amine disulfide or thiuram sulfide, and with other routinely used ingredients, for example zinc oxide, stearic acid, a filler, and an antidegradant. Conventional amounts of these routinely used additives are used.

The additives can be incorporated into unvulcanized rubber by conventional means, for example using an internal mixer or a roll mill, or by adding a solution or suspension to a rubber latex, giving a mixture which is subsequently vulcanized at an elevated temperature. This temperature is one that is appropriate to the particular rubber concerned, for example a temperature in the range of 120°–155° C. where the composition is based on natural rubber, or a temperature in the range of 140°–160° C. where the composition is based on styrene-butadiene rubber.

The amount of accelerator used depends on a number of factors including for example the type of rubber and the use for which the vulcanized product is required. The amount is, however, usually within the range of 0.3 to 5 parts by weight, and more especially within the range of 0.3 to 2 parts by weight, per 100 parts by weight of rubber, for example 0.5 and 1.5 parts by weight.

The data in the table, infra, illustrate the use of the compounds of this invention as accelerators for the vulcanization of rubber. The data includes results for the corresponding sulfenamide. A masterbatch composition is prepared by compounding the following:

| | Parts by weight |
|---|---|
| Natural rubber smoked sheets | 100 |
| Carbon black | 50 |
| Zinc oxide | 5.0 |
| Stearic acid | 3.0 |
| Hydrocarbon softener | 10.0 |
| Sulfur | 2.5 |
| N-1,3-dimethylbutyl - N' - phenyl-p-phenylene-diamine (an antidegradant) | 2.0 |
| Accelerator | 0.5 |

In one test reported in the table, a sample of rubber is placed in a Mooney plastometer. The time, $t_5$, taken for the reading of the instrument to reach 5 units above the minimum viscosity of the sample is recorded as a measure of the scorch time. The higher this figure, the greater the scorch delay action of the accelerator.

In the second test method, cure time and modular properties of a rubber sample are measured using the Monsanto Oscillating Disk Rheometer described by Decker, Wise, and Guerry in Rubber World, December 1962, page 68. The scorch time, $t_2$, is recorded as the time to reach 2 units above the minimum viscosity of the sample. The cure time, $t_{90}$, is recorded as the time in minutes to reach 90% of the maximum cure, and the maximum torque, R.M.T., is recorded as a measure of the modulus of the sample.

TABLE

| | Mooney scorch at 121° C. | | Rheometer at 144° C. | | | |
|---|---|---|---|---|---|---|
| | $t_5$ | $t_{35}-t_5$ | R.M.T. | $t_2$ | $t_{90}$ | $k_2$ |
| 2-morpholinosulfinyl-benzothaizole | 48.3 | 12.1 | 47.7 | 11.0 | 38.8 | .099 |
| 2-morpholinothio-benzothiazole | 43.8 | 4.7 | 54.5 | 11.8 | 30.5 | .148 |
| 2-(2,6-dimethyl-4-morpholinosulfinyl)-benzothiazole | 50.4 | 13.0 | 46.4 | 11.4 | 40.8 | .094 |
| 2-(2,6-dimethyl-4-morpholinothio)-benzothiazole | 43.4 | 6.6 | 53.0 | 10.4 | 31.4 | .126 |

The data in the table illustrate the greater degree of delayed action of the compounds of this invention as accelerators in comparison with the corresponding sulfenamide. The figures for the cure rates and moduli of vulcanizates represent high degrees of accelerator activity. Comparable results are obtained with the accelerators of this invention not illustrated.

It is intended to cover all changes and modifications of the examples of the invention herein chosen for purposes of disclosure which do not constitute departures from the spirit and scope of the invention.

We claim:
1. A process for vulcanizing a sulfur-vulcanizable rubber which comprises:
mixing the rubber with a sulfur-containing vulcanizing agent and an accelerating amount of a vulcanization accelerator of the formula

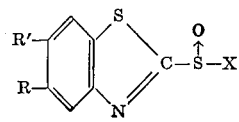

wherein
X is morpholine, monoalkyl-morpholine, dialkyl-morpholine, trialkyl-morpholine, or tetraalkyl-morpholine,
R and R' are identical or dissimilar combinations of hydrogen, $NO_2$, $CONH_2$, OH, halogen, $$-\overset{O}{\underset{\|}{C}}-O-\text{alkyl}, \quad -\overset{O}{\underset{\|}{C}}-\text{alkyl},$$

alkyl, or alkoxy and the alkyl groups contain 1 to 5 carbon atoms and
heating the mixture at a vulcanizing temperature.

2. A process for vulcanizing a sulfur-vulcanizable rubber according to claim 1 wherein the accelerator is 2-morpholinosulfinylbenzothiazole.

3. A process for vulcanizing a sulfur-vulcanizable rubber according to claim 1 wherein the accelerator is 2-(2,6-dimethyl-4-morpholinosulfinyl)benzothiazole.

References Cited
UNITED STATES PATENTS

| 2,585,155 | 2/1952 | Mingasson | 260—306.6 |
| 3,308,103 | 3/1967 | Coran | 260—79.5 |
| 3,454,590 | 7/1969 | Neale | 260—306.6 |

JOSEPH L. SCHOFER, Primary Examiner

C. A. HENDERSON, Jr., Assistant Examiner

U.S. Cl. X.R.

260—247.1, 306.6 R, 306.6 A, 786, 788

UNITED STATES PATENT OFFICE
CERTIFICATE OF CORRECTION

Patent No. 3,635,918      Dated January 18, 1972

Inventor(s) Alfred Bay Sullivan and Robert Henry Campbell

It is certified that error appears in the above-identified patent and that said Letters Patent are hereby corrected as shown below:

Column 1, line 6, after "Patent No." delete "3,454,590" and insert --3,532,693--

Column 1, line 31, "3,454,590" should read --3,532,693--

Column 1, line 47, "sulfonamides" should read --sulfenamides--

Signed and sealed this 3rd day of April 1973.

(SEAL)
Attest:

EDWARD M. FLETCHER, JR.
Attesting Officer

ROBERT GOTTSCHALK
Commissioner of Patents (Page 1 of 1)